(12) United States Patent
Muehlbacher et al.

(10) Patent No.: US 10,455,330 B2
(45) Date of Patent: Oct. 22, 2019

(54) METHOD FOR OPERATING A SENSOR, AND SENSOR

(71) Applicant: Infineon Technologies AG, Neubiberg (DE)

(72) Inventors: Benno Muehlbacher, St. Magdalen (AT); Andreas Wiesbauer, Poertschach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 140 days.

(21) Appl. No.: 15/821,785

(22) Filed: Nov. 23, 2017

(65) Prior Publication Data

US 2018/0146297 A1 May 24, 2018

(30) Foreign Application Priority Data

Nov. 24, 2016 (DE) ...................... 10 2016 122 672.6

(51) Int. Cl.

| H04R 11/04 | (2006.01) |
|---|---|
| G01K 7/00 | (2006.01) |
| H04R 7/16 | (2006.01) |
| H04R 19/00 | (2006.01) |
| H04R 19/04 | (2006.01) |
| G01K 13/00 | (2006.01) |

(52) U.S. Cl.
CPC ............. *H04R 11/04* (2013.01); *G01K 7/00* (2013.01); *G01K 13/00* (2013.01); *H04R 7/16* (2013.01); *H04R 19/005* (2013.01); *H04R 19/04* (2013.01); *H04R 2201/003* (2013.01); *H04R 2410/03* (2013.01); *H04R 2499/11* (2013.01)

(58) Field of Classification Search
CPC ........ H04R 11/04; H04R 7/16; H04R 19/005; H04R 19/04; H04R 2201/003; H04R 2410/03; H04R 2499/11; G01K 7/00; G01K 13/00
USPC ....................................................... 381/398
See application file for complete search history.

(56) References Cited

U.S. PATENT DOCUMENTS

| 4,255,700 | A | * | 3/1981 | Takeda ................. | G01R 21/003 323/210 |
|---|---|---|---|---|---|
| 5,097,193 | A | * | 3/1992 | Neis ......................... | H02P 5/46 318/800 |
| 5,173,645 | A | * | 12/1992 | Naito ........................ | H02P 6/10 318/400.04 |
| 2006/0290325 | A1 | | 12/2006 | Ashtiani | |
| 2011/0247900 | A1 | * | 10/2011 | Blasko .................... | B66B 1/302 187/247 |
| 2013/0330578 | A1 | | 12/2013 | Domel | |
| 2015/0333566 | A1 | * | 11/2015 | Berard .................. | H02J 3/1842 307/64 |
| 2017/0366007 | A1 | * | 12/2017 | Abelen ................. | H02J 3/1878 |

FOREIGN PATENT DOCUMENTS

DE 102011004624 A1 8/2012

* cited by examiner

*Primary Examiner* — Sean H Nguyen
(74) *Attorney, Agent, or Firm* — Viering, Jentschura & Partner MBB (57) ABSTRACT

In various embodiments, a method for operating a sensor is provided. The method includes intermittently generating an operating current in the sensor, generating a reactive current in the sensor when the operating current is not generated, and not generating the reactive current when the operating current is generated. A value of the reactive current is the same or approximately the same as a value of the operating current.

20 Claims, 4 Drawing Sheets

METHOD FOR OPERATING A SENSOR, AND SENSOR

CROSS-REFERENCE TO RELATED APPLICATION

This application claims priority to German Patent Application Serial No. 10 2016 122 672.6, which was filed Nov. 24, 2016, and is incorporated herein by reference in its entirety.

TECHNICAL FIELD

Various embodiments relate generally to a method for operating a sensor and to a sensor.

BACKGROUND

A sensor may be a sound sensor, that is to say a microphone, a temperature sensor, a pressure sensor or a gas sensor, for example. Today, many apparatuses have sensors for capturing their surroundings. By way of example, mobile phones, tablet computers, handheld computers, laptops and/or screens have small microphones, e.g. miniaturized microphones. Other apparatuses, such as domestic appliances or motor vehicles, for example, also regularly have sensors, however, for example temperature sensors, pressure sensors or gas sensors.

Various operating currents regularly flow in such sensors, for example for initializing a measurement, for performing a measurement and/or for transmitting a value that is representative of the correspondingly captured measured variable. The operating currents can impair and/or corrupt the quality of the measurements, however. By way of example, the applicable sensors or at least subregions of the sensors are unintentionally heated by means of the operating currents, as a result of which the applicable measurement results can be influenced. Apart from the operating currents that are variable over time, base currents that are constant over time can also flow in the sensors, for example for maintaining a standby mode. The constant base currents contribute to constant heating of the sensors. The operating currents and the base currents together form the total operating currents of the sensors.

Conventional microphones, for example, in particular miniaturized microphones, frequently each have a microsystem (MEMS) having a diaphragm, have an analogue-to-digital converter, an amplifier and/or an integrated circuit and an interface for communication with an apparatus that is external to the microphone, and also optionally a temperature sensor. The diaphragm, together with an electrically conductive plate, forms a capacitor in the microphone. The diaphragm is used to pick up pressure vibrations and/or sound vibrations that cause the diaphragm to vibrate in a corresponding manner. On account of the vibrating diaphragm, a distance between the diaphragm and the plate changes, which results in an inversely proportional capacitance change that can be evaluated by an appropriate integrated circuit.

Optionally, the integrated circuit can amplify, modulate and/or otherwise alter the electrical signals. If need be, the analogue-to-digital converter can convert the analogue signal into a digital signal. The analogue-to-digital converter and the amplifier/impedance converter may be elements of the integrated circuit, for example. The integrated circuit can forward the possibly altered electrical signals via the interface to the apparatus that is external to the microphone. The optionally provided temperature sensor can be used to sense the temperature of the microphone and to take it into consideration when evaluating and/or further-processing the electrical signal of the microphone in order to be able to provide as good a sound pickup quality as possible.

During the operation of such a microphone, base currents that are fundamentally constant over time are used, but it is also possible for regularly changing operating currents to occur within the microphone. The constant base currents are used to provide the functionality of the microphone. The changing operating currents arise, inter alia, during a communication particularly between the microsystem and the integrated circuit, the integrated circuit and the interface and/or the temperature sensor and the integrated circuit using modulated currents that can be referred to as the operating currents, the information exchanged during the communication being encoded in the applicable modulation. In addition, some transmission forms and/or transmission protocols require one clock signal each in order to demodulate the modulated signal and to extract the information from the relevant signal.

The operating currents can lead to relatively fast heating of the microphone, e.g. of the microsystem and the diaphragm, and if the operating currents terminate abruptly, for example in the event of breaks in communication, then this can lead to relatively fast cooling of the microphone, e.g. of the microsystem and the diaphragm. Such a temperature change in the microsystem and e.g. in the diaphragm leads to deformation of the diaphragm and hence to a change of pressure in the pressure chamber that are registered by the microsystem and the integrated circuit as an electrical signal or at least as part of the electrical signal and cause low-frequency noise or else a sound in the output signal of the microphone that, if audible, is perceptible as hum.

In a comparable manner, it is also possible for operating currents in other sensors to influence the applicable measurement results. By way of example, operating currents occur in all sensors that are used for the communication of the sensors with applicable external apparatuses, e.g. for transmitting data that are representative of the captured measured values. Alternatively or in addition, it is generally possible for operating currents to arise that are used for the operation of the applicable sensor. By way of example, there are gas sensors that are heated during operation by means of various operating currents that can likewise have an adverse effect on measurement accuracy.

SUMMARY

In various embodiments, a method for operating a sensor is provided. The method includes intermittently generating an operating current in the sensor, generating a reactive current in the sensor when the operating current is not generated, and not generating the reactive current when the operating current is generated. A value of the reactive current is the same or approximately the same as a value of the operating current.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the detailed description that follows, reference is made to the accompanying drawings, which form part of this description and show for illustration purposes specific embodiments in which the invention can be implemented. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various embodiments described herein can be combined with one another, unless specifically indicated otherwise. Therefore, the detailed description that follows should not be interpreted in the restrictive sense, and the scope of protection of the present invention is defined by the appended claims. In the figures, identical or similar elements are provided with identical reference symbols, in so far as this is expedient.

Figure 1:
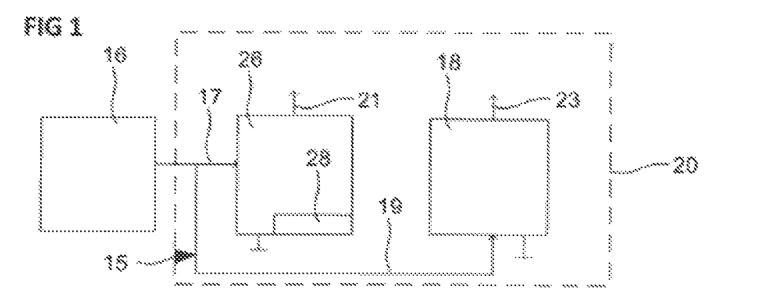
FIG. 1 shows a block diagram of an embodiment of a sensor arrangement.

FIG. 1 shows a block diagram of an embodiment of a sensor arrangement 20.

The sensor arrangement 20 has a sensor 20 and an apparatus 16 external to the sensor 20. The sensor 20 is a gas sensor, a pressure sensor, a temperature sensor or a sound wave sensor, e.g. a microphone. The external apparatus 16 has a processor for processing, sending and/or receiving data. Further, the external apparatus 16 may have a memory element for storing data. The external apparatus 16 is used for controlling, actuating and/or operating the sensor 20. The sensor 20 and the external apparatus 16 can communicate with one another via a bus system 15.

The external apparatus 16 and the sensor 20 may be accommodated in a common housing or in housings that are physically separate from one another. The external apparatus 16 may be a computer or a part of a computer. The sensor 20 may be a part of a computer. By way of example, the sensor arrangement, the external apparatus 16 and/or the sensor 20 may be integrated in a device, for example a mobile phone, a tablet computer, a handheld computer, a laptop and/or a screen. The external apparatus may be a processor of the device in which the sensor 20 is arranged, for example. Alternatively, the external apparatus 16 may be a part of a motor vehicle or of a domestic appliance.

The sensor 20 has an integrated circuit 26 having an interface 28. The integrated circuit 26 optionally has an analogue-to-digital converter, not depicted in FIG. 1, and an amplifier, not depicted in FIG. 1. The integrated circuit 26 causes a total operating current 21 in the sensor 20. The total operating current 21 at least intermittently has an operating current or is at least intermittently the operating current. The operating current can be used for capturing and/or transmitting data, e.g. measurement results, or for operating an electrical unit of the sensor 20, for example, said electrical unit not being depicted in FIG. 1. The electrical unit may be a temperature sensor or a thermoelement for controlling or regulating a temperature of the sensor 20, for example.

Optionally, the total operating current 21 can have a base current independently of the occurrence of the operating current. By way of example, the base current may be a current that is constant or at least approximately constant during the operation of the sensor 20, for example a current that is required for a standby mode of the sensor 20.

The interface 28 is designed for the communication of the sensor 20 with the apparatus 16 external to the sensor 20. The interface 28 may be an i2C interface, for example. The external apparatus 16 and the sensor 20 can communicate with one another via a first communication signal 17, for example.

The sensor 20 has a reactive current source 18. The reactive current source 18 is used for generating a reactive current 23. The reactive current source 18 is controllable or regulable by means of the external apparatus 16, e.g. by means of a second communication signal 19. In various embodiments, the external apparatus 16 of the reactive current source 23 can prescribe a value of the reactive current 23. The external apparatus 16 communicates directly with the reactive current source 18 by means of the bus system 15. Alternatively, the external apparatus 16 and the reactive current source 18 can communicate with one another via the interface 28.

During the communication of the sensor 20 with the external apparatus 16, the external apparatus 16 can act as a bus master of the bus system 15 and check which slaves, for example the sensor 20, are connected to the bus system 15. The slave, e.g. the sensor 20, needs to check, for example by means of the integrated circuit 26, whether it is addressed, e.g. spoken to, and, if so, it returns a confirmation to the external apparatus 16. These processes are realized by means of modulated currents in the integrated circuit 26, as a result of which energy is consumed and heat is generated. In addition, information, particularly data, needs to be sent to the integrated circuit 26 and/or the external apparatus, for example if said information is requested. If need be, the information, particularly the data, is transmitted in the form of modulated currents, as a result of which energy is again consumed and heat generated. In the case of some transmission forms and/or transmission protocols for transmitting information, a communication clock signal is needed and transmitted in addition to a data signal that contains the data. The communication clock signal also results in a dynamic current change, as a result of which energy is consumed and heat is generated. All the currents that are used for communication, e.g. for the transmission of information and/or data, can be referred to as operating currents. In addition to the currents that are used for the communication, further currents can also flow in the sensor 20 that are indispensable for the basic operation of the sensor, namely the capturing of measured values and the generating of a corresponding electrical output signal. These currents can also be referred to as operating currents. The operating currents always cause losses of energy and are heat sources that, although they can be minimized, cannot be eliminated. Therefore, the operating currents form all the currents that are not constant over time in the sensor 20 that are needed for conventional operation of the sensor 20.

The heat sources are thermally coupled into the sensor 20 and cause heating of the sensor 20. If the temperature of the sensor 20 changes, component parts of the sensor 20 expand or contract depending on whether the temperature rises or falls. These changes can influence the measured values that are intended to be ascertained by the sensor 20, which is reflected as an electrical signal, e.g. as an interference signal, in the output signal of the sensor 20. Since this electrical signal is independent of one of the measured variables that is actually meant to be captured, which is supposed to be captured by the sensor 20, this generates an undesirable electrical signal that is included in the output signal of the sensor 20 as low-frequency noise and/or interference, for example. Thus, the sensor 20 and e.g. the integrated circuit 26 and the reactive current source 18 are configured such that the temperature of the sensor 20 changes particularly little and/or approximately not at all on the basis of the operating currents.

The operating currents flow in reaction to the first communication signal 17, which the integrated circuit 26 receives from the external apparatus 16. The external apparatus 16 therefore knows when one of the operating currents flows and what value this operating current has. During the periods of time during which the operating currents do not flow, the external apparatus 16 actuates the reactive current source 18 by means of the second communication signal 19 such that it generates the reactive current 23, which serves as a heat source and which is not part of the operating currents. In various embodiments, the reactive current 23 is generated such that the resultant heat corresponds to the heat resulting from the operating currents. Therefore, the thermal energy that is introduced into the sensor 20 during the periods of time during which the operating currents flow and the thermal energy that is introduced into the sensor 20 during the periods of time during which the operating currents do not flow and the reactive current 23 flows are kept the same or at least approximately the same. This causes an input of energy and hence heat into the sensor 20 that is constant or at least approximately constant over the whole operating period of the sensor 20, the temperature of said sensor thus changing particularly little and/or approximately not at all. This causes the undesirable interference signal—which is e.g. not conditional upon the measured variable to be captured, for example the low-frequency noise, to be particularly minor and/or approximately eliminated in the output signal of the sensor 20.

Further details regarding the manner in which the change in the temperature of the sensor 20 and hence the occurrence of the interference signal are prevented are explained in more detail below with reference to FIG. 5 and FIG. 6.

Figure 2:
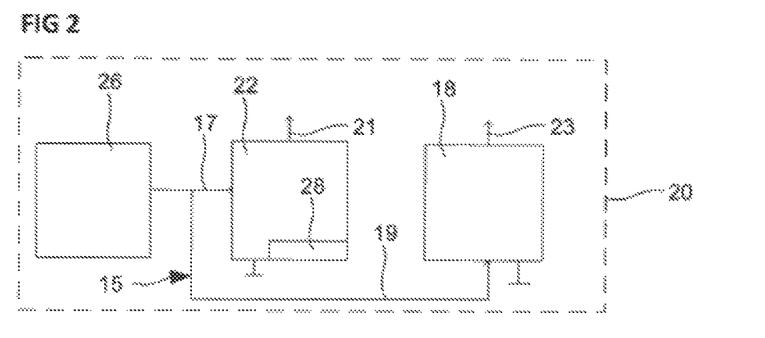
FIG. 2 shows a block diagram of an embodiment of a sensor.

FIG. 2 shows a block diagram of an embodiment of a sensor 20. The sensor 20 can largely correspond to the sensor 20 explained with reference to FIG. 1, for example. The sensor 20 is likewise coupled to the external apparatus 16, which is not depicted in FIG. 2, however. The sensor 20 has a sensor element that is used for capturing the measured variable. In the case of a pressure sensor, gas sensor or microphone as sensor 20, the sensor element may be a microsystem (MEMS) 22, for example.

The integrated circuit 26 communicates with the sensor element by means of the first communication signal 17 and with the reactive current source 18 by means of the second communication signal 19. The first and second communication signals 17, 19 can be counted among the operating currents. Further instances of the operating currents flow in reaction to the first communication signal 17, which the sensor element receives from the integrated circuit 26. The integrated circuit 26 therefore knows when one of the operating currents flows and what value this operating current has. During the periods of time during which the operating currents do not flow, the integrated circuit 26 actuates the reactive current source 18 such that it generates the reactive current 23, which serves as a heat source. In various embodiments, the reactive current 23 is generated such that the resultant heat corresponds to the heat resulting from the operating currents. Therefore, the thermal energy that is introduced into the sensor 20 during the periods of time during which the operating currents flow and the thermal energy that is introduced into the sensor 20 during the periods of time during which the operating currents do not flow and the reactive current 23 flows are kept the same or at least approximately the same. This causes an input of energy and hence heat into the sensor 20 that is constant or at least approximately constant over the whole operating period of the sensor 20, the temperature of said sensor thus changing particularly little and/or approximately not at all. This causes the undesirable interference signal—which is particularly not conditional upon the measured variable to be captured, for example the low-frequency noise, to be particularly minor and/or approximately eliminated in the output signal of the sensor 20.

Further details regarding the manner in which the integrated circuit 26 prevents the change in the temperature of the sensor 20 and hence the interference signal are explained in more detail below with reference to FIG. 5 and FIG. 6.

Figure 3:
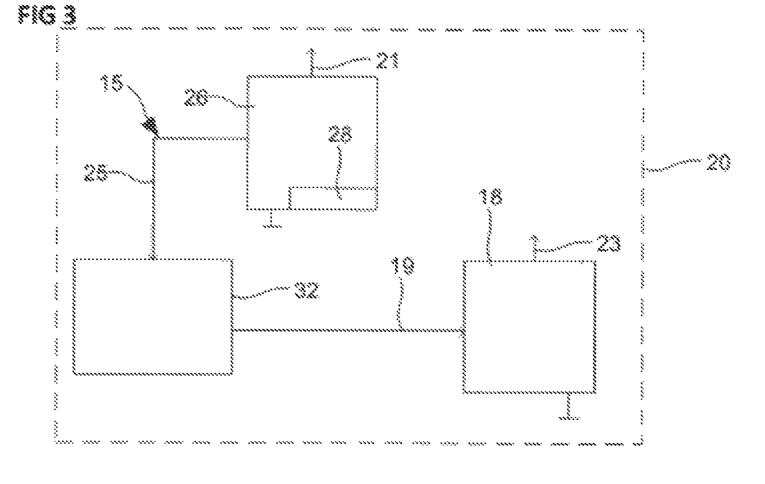
FIG. 3 shows a block diagram of an embodiment of a sensor.

FIG. 3 shows a block diagram of an embodiment of a sensor 20. The sensor 20 can largely correspond to one of the sensors 20 explained above, for example. The sensor 20 has a detection circuit 32. The detection circuit 32 is electrically connected to the integrated circuit 26 and to the reactive current source 18. Alternatively, the detection circuit 32 may be integrated in the integrated circuit 26. The detection circuit 32 is used to monitor whether or not one of the operating currents flows in the sensor 20. Optionally, the detection circuit 32 may be configured to ascertain a value of the operating current when said operating current flows. The detection circuit 32 may, to this end, have a current measuring apparatus and/or a voltage measuring apparatus. In other words, the detection circuit 32 is used to ascertain the times or periods of time at which the operating currents flow and optionally the values of the operating currents when they flow. Therefore, the external apparatus 16 and/or the integrated circuit 26 needs to know neither the times or the periods of time at which the operating currents flow nor the values of the operating currents in advance, since these are ascertained dynamically and/or individually by the detection circuit 32.

Otherwise, e.g. in regard to the generation of the reactive currents 23 and the associated minimization or elimination of the temperature change in the sensor 20, the sensor 20 shown in FIG. 3 corresponds substantially to the sensors 20 explained with reference to FIG. 1 and FIG. 2, which is why a further, e.g. repeated, depiction of the operation of the sensor 20 is dispensed with at this juncture.

Figure 4:
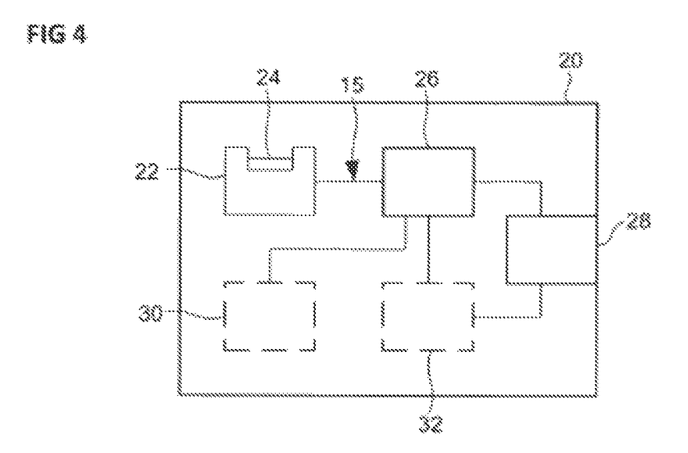
FIG. 4 shows a block diagram of an embodiment of a microphone.

FIG. 4 shows a block diagram of an embodiment of a sensor 20 that is configured as a microphone. The microphone can also be referred to as a miniaturized microphone or chip microphone. The microphone may be integrated in a device, for example a mobile phone, a tablet computer, a handheld computer, a laptop and/or a screen. The microphone has a microsystem (MEMS) 22 as sensor element, the integrated circuit 26 and the interface 28. The integrated circuit 26 is connected firstly to the microphone and secondly to the interface 28.

Optionally, the microphone 20 has a temperature sensor 30 and/or the detection circuit 32. If need be, the temperature sensor 30 and/or the detection circuit 32 are connected to the integrated circuit 26. Alternatively, the temperature sensor 30 and/or the detection circuit 32, if on hand, may be integrated in the integrated circuit 26. Further, the temperature sensor 30 may alternatively be integrated in the microsystem 22. The microsystem 22 has a moving diaphragm 24 and a capacitor plate, not depicted in FIG. 4, that may optionally be configured as a fixed diaphragm and that is opposite the diaphragm 24. The diaphragm 24 and the capacitor plate form a capacitor, the capacitance of which is dependent on a distance between the diaphragm 24 and the capacitor plate. The microsystem 22 may be configured as a chip package, that is to say as a single chip in a housing.

The integrated circuit 26 optionally has an analogue-to-digital converter, not depicted in FIG. 4, an amplifier, not depicted in FIG. 4, and the reactive current source 18, not depicted in FIG. 4. Alternatively, the microsystem 22 can have the analogue-to-digital converter and/or the amplifier. The interface 28 is configured for the communication of the microphone with the apparatus 16 external to the microphone.

The diaphragm 24 is used to pick up sound vibrations that cause the diaphragm 24 to vibrate in a corresponding manner. In various embodiments, the diaphragm 24 is deflected by pressure changes, for example on account of the sound vibrations, which results in a change of distance for the diaphragm 24 in relation to the capacitor plate and hence in a change of capacitance in the applicable capacitor. This change of capacitance can be evaluated by the integrated circuit 26 and interpreted as an audible signal. The integrated circuit 26 therefore senses the change of capacitance and generates the electrical signal corresponding to the change of capacitance and hence corresponding to the captured sound waves. Optionally, the integrated circuit 26 can amplify, modulate and/or otherwise change the electrical signal. In various embodiments, the amplifier can be used to amplify the electrical signal. If need be, the analogue-to-digital converter can convert the amplified analogue signal into a digital signal. The integrated circuit 26 can forward the possibly changed electrical signals via the interface 28 to the apparatus 16 external to the microphone.

The optionally arranged temperature sensor 30 can be used to sense the temperature of the microphone and to take into consideration when evaluating and/or further-processing the electrical signal of the microphone, in order to be able to provide as good a sound pickup quality as possible.

The optionally arranged detection circuit 32 can be used to monitor whether or not one of the operating currents flows in the microphone. Optionally, the detection circuit 32 may be configured to ascertain a value of the operating current when said operating current flows. The detection circuit 32 can have a current measuring apparatus and/or a voltage measuring apparatus.

During the communication of the microphone with the external apparatus 16, the external apparatus 16 can act as a bus master of the bus system 15 and check which slaves, for example the microphone, are connected to the bus system 15. The slave, particularly the microphone, needs to check whether it is addressed, e.g. spoken to, and, if so, it returns a confirmation to the external apparatus 16. These processes are realized by means of modulated currents, for example in the integrated circuit 26, as a result of which energy is consumed and heat is generated. In addition, the temperature sensor 30, if on hand, needs to send information, particularly data, to the integrated circuit 26 and/or the external apparatus 16 if said information is requested. If need be, the information, particularly the data, is transmitted in the form of modulated currents, as a result of which energy is again consumed and heat generated. In the case of some transmission forms and/or transmission protocols for transmitting information, a communication clock signal is needed and transmitted in addition to a data signal that contains the data. The communication clock signal also results in a dynamic current change, as a result of which energy is consumed and heat is generated. All the currents that are used for communication, e.g. for the transmission of information and/or data, can be referred to as operating currents. In addition to the currents that are used for the communication, further currents can also flow in the microphone that are indispensable for the basic operation of the microphone, namely the capturing of sound vibrations and the generating of a corresponding electrical output signal. These currents can also be referred to as operating currents. The operating currents always cause losses of energy and are heat sources that, although they can be minimized, cannot be eliminated.

The heat sources are thermally coupled to the microsystem 22 and cause heating of the microsystem 22, e.g. the diaphragm 24. If the temperature of the diaphragm 24 changes, said diaphragm expands or contracts, depending on whether the temperature rises or falls. This change in the diaphragm 24 causes a change of capacitance that is sensed by the integrated circuit 26. This can also be referred to as a thermoacoustic effect. Since this change of capacitance is independent of a sound vibration that is supposed to be picked up by the diaphragm 24, this generates an undesirable electrical signal that is included in the output signal of the microphone as low-frequency noise and/or as sound and, on appropriate output via a loudspeaker, can sometimes, if audible in the first place, be perceived as hum. Therefore, the microphone and e.g. the integrated circuit 26 are configured such that the temperature of the microphone, e.g. of the microsystem 22, changes particularly little and/or approximately not at all on the basis of the operating currents.

The change in the temperature of the diaphragm 24 and the resultant low-frequency noise in the output signal of the microphone can be kept particularly small and/or approximately eliminated by means of the reactive current source 18 of the integrated circuit 26. In various embodiments, the integrated circuit 26 is configured to ascertain and/or sense when the operating currents explained above flow and when they do not flow. To this end, by way of example, the lines used for the current flow of the operating currents can be monitored, for example by means of ammeters and/or voltmeters or if need be by means of the detection circuit 32.

During the periods of time during which the operating currents do not flow, the integrated circuit 26 actuates the reactive current source 18 such that it generates the reactive current 23, which serves as a heat source. In various embodiments, the reactive current 23 is generated such that the resultant heat corresponds to the heat resulting from the operating currents. Therefore, the thermal energy that is introduced into the microsystem 22 during the periods of time during which the operating currents flow and the thermal energy that is introduced into the microsystem 22 during the periods of time during which the operating currents do not flow and the reactive current 23 flows are kept the same or at least approximately the same. This causes an input of energy and hence heat into the microsystem 22 and into the diaphragm 24 that is constant or at least approximately constant over the whole operating period of the microphone, the temperatures of said microsystem and diaphragm changing particularly little and/or approximately not at all. This causes the undesirable low-frequency noise—which is particularly not conditional upon captured sound vibrations—in the output signal of the microphone to be particularly minor and/or approximately eliminated.

Further details regarding the manner in which the integrated circuit 26 prevents the change in the temperature of the microsystem 22 and e.g. of the diaphragm 24 and hence the low-frequency noise are explained in more detail below with reference to FIG. 5 and with reference to FIG. 6.

Figure 5:
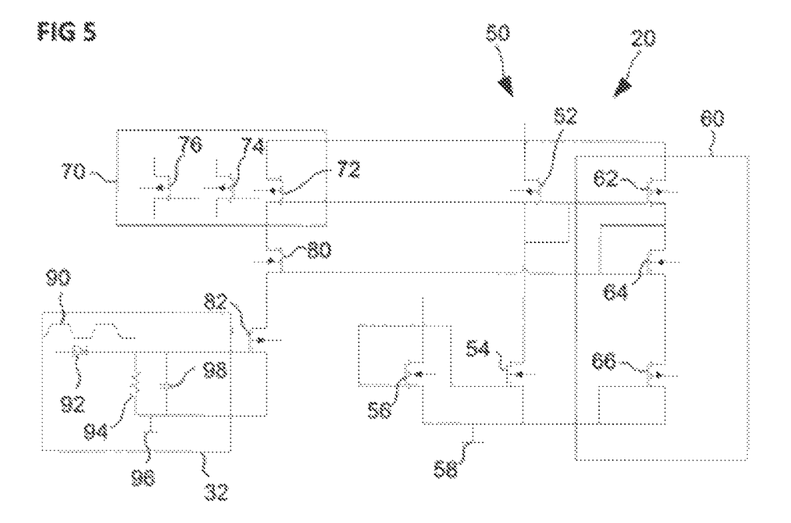
FIG. 5 shows a circuit diagram of an embodiment of a microphone.

FIG. 5 shows a circuit diagram of an embodiment of a microphone, for example the microphone explained above. For reasons of simplicity and/or for reasons of cost, all the transistors of the microphone that are cited below are normally off MOSFETs, the symbols in FIG. 2 revealing whether they are n-channel or p-channel MOSFETs. A corresponding circuit can also be realized using other transistors, however.

A supply voltage 50 for the integrated circuit 26 is connected to a drain of a first transistor 52. A source and a gate of the first transistor 52 are connected to a drain of a second transistor 54. A gate of the second transistor 54 is connected to a drain and a gate of a third transistor 56. A source of the second transistor 54 is connected to a source of the third transistor 56 and to a first earth potential 58.

A reference component 60 has a fourth transistor 62, a fifth transistor 64 and a sixth transistor 66. A drain of the fourth transistor 62 is connected to the supply voltage 50 and the drain of the first transistor 52. A gate of the fourth transistor 62 is connected to a gate of the first transistor 52. A source of the fourth transistor 62 is connected to a source and to a gate of the fifth transistor 64. A source of the fifth transistor 64 is connected to a drain of the sixth transistor 66. A gate and a source of the sixth transistor 66 are connected to the source of the second transistor 54, to the source of the third transistor 56 and to the first earth potential 58. The source of transistor 56 has the required operating current applied to it.

An electronic component 70 is configured as an electrical power supply by means of which the required reactive current 23 can be selected. Optionally, still further transistors besides those depicted can be arranged. The electronic component 70 has a seventh transistor 72, an eighth transistor 74 and a ninth transistor 76. A drain of the seventh transistor 72 is connected to the supply voltage 50, the drain of the first transistor 52 and the drain of the fourth transistor 62. A gate of the seventh transistor 72 is connected to the source of the first transistor 52, the drain of the second transistor 54 and the gate of the fourth transistor 62. The transistors 74 and 76 are connected to one another via a switch for the drain of the seventh transistor 72.

A drain of a tenth transistor 80 is connected to a drain of the seventh transistor 72. A gate of the tenth transistor 80 is connected to the gate of the fifth transistor 64 and the source of the fourth transistor 62. A drain of an eleventh transistor 82 is connected to a source of the tenth transistor 80.

The detection circuit 32 receives a clock signal 90, which is representative of the flowing of the operating current, and has a diode 92, a resistor 94, a second earth potential 96 and a capacitor 98. The diode 92 is connected in the forward direction to a first side of the resistor 94, a first side of the capacitor 98 and to a gate of the eleventh transistor 82. A second side of the resistor 94 is connected to the second side of the capacitor 98, to a source of the eleventh transistor 82 and to the second earth potential 96. Moreover, the source of the eleventh transistor 82 is connected to the second earth potential 96.

If the operating current flows, the diode 92 rectifies the clock signal 90, as a result of which the capacitor 98 charges. If the operating current does not flow, the capacitor 98 discharges via the resistor 94. From a particular charge of the capacitor 98 onward, the eleventh transistor 82 is off. The charge from which the eleventh transistor 82 turns on can be selected by means of the reference component 60, e.g. by means of the fourth, fifth and sixth transistors 62, 64, 66. In this case, the operating point of the tenth transistor 80 is selected by means of the fifth transistor 64. If the capacitor 94 is discharged, the detection circuit 32 and the sixth transistor 66 have the same gate/source voltage and also the same gate/drain voltage. At the source of the fifth transistor 64, a voltage appears that corresponds to the sum of the threshold voltages of the fifth and sixth transistors 64, 66. This voltage is also applied to the source of the tenth transistor 80. If the gate of the eleventh transistor 82 is at a voltage of 0V (as also in the case of the sixth transistor 66), the current through the electronic component 70 can flow through the tenth and eleventh transistors 80, 82 to the earth potential, for example the earthing. If the voltage at the gate of the eleventh transistor 82 rises to approximately twice the threshold voltage or more, then no further current can flow through the tenth transistor 80, since said tenth transistor is now in the off state.

In general, the ascertaining of the operating current and the associated selecting of the applicable reactive current 23 can be effected by means of a firmware solution and programmed values for the currents or by means of adding the detection circuit 32. The detection circuit can be realized as a feedback loop, which minimizes crosstalk, for example. For this purpose, frequency detection can be used, since the values of the operating current that flows as communication current via the interface 28 are dependent on the frequency of said communication current, for example. By way of example, a typical instance of application of the frequency of a communication clock signal for an I2C interface is 400 kHz or 1 MHz. These frequencies can easily be found by means of the detection circuit 32, for example by virtue of the latter comparing the communication clock signal with an internal clock signal.

Figure 6:
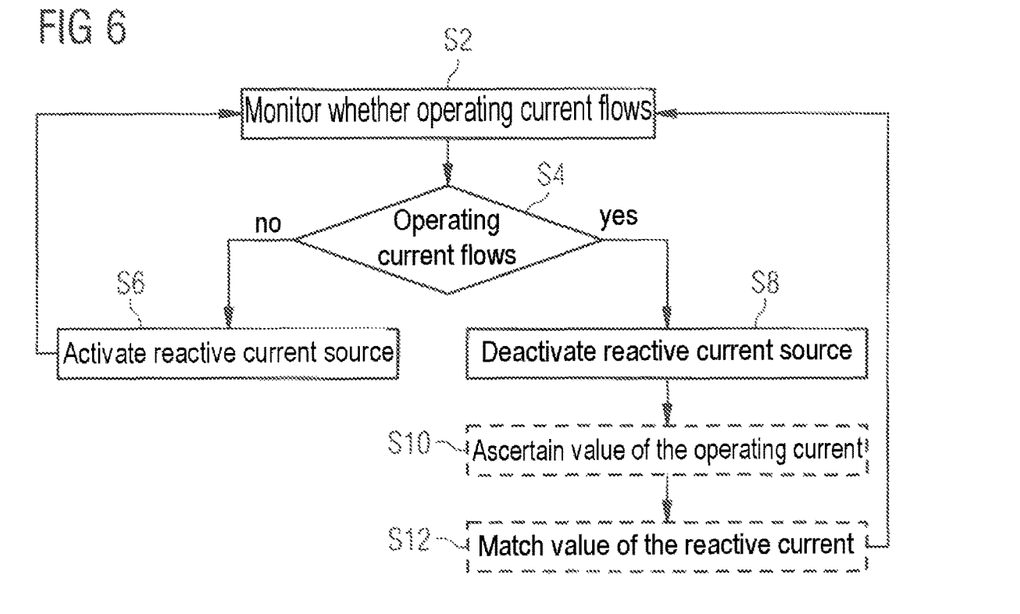
FIG. 6 shows a flowchart for an embodiment of a method for operating a sensor.

FIG. 6 shows a flowchart for an embodiment of a method for operating a sensor, for example the sensor 20 explained above, for example the microphone. The method may be configured in the form of a computer program with applicable computer-readable instructions, for example, and may be stored on a mobile data storage medium, for example a memory stick, an external hard disk, a flash memory or a CD-ROM, and/or on a memory unit of the integrated circuit 26. When the computer program is started, it causes the computer, for example the external apparatus 16, and/or the integrated circuit 26 to execute the applicable computer-readable instructions and e.g. the steps described below.

Alternatively, the method may be configured in the form of a hard-wired logic circuit and/or may be integrated in the integrated circuit 26.

S2 involves monitoring whether an operating current, particularly one of the operating currents explained above, flows in the sensor 20. By way of example, it can involve monitoring whether the sensor 20 communicates with the external apparatus 16 by means of the operating current via the interface 28, and/or it can involve monitoring whether, by means of the operating current, a communication takes place within the sensor 20, e.g. between the individual component parts of the sensor 20, for example between the integrated circuit 26 and the interface 28 and/or between the integrated circuit 26 and the temperature sensor 30. To monitor whether the operating current flows, it is possible for the operating current itself, the voltage causing the operating current and/or the voltage caused by the operating current to be detected or captured, for example.

S4 either involves identifying that the operating current flows or involves identifying that no operating current flows. If the operating current does not flow, the processing is continued in S6. If the operating current, that is to say at least one of the operating currents, flows, then the processing is continued in S8.

S6 involves the reactive current source 18 being activated. In various embodiments, the reactive current source 18 is activated such that the reactive current 23 generated by means of it generates a heat that corresponds to the heat otherwise generated by means of the operating current or by means of the operating currents. By way of example, the reactive current 23 is generated such that a value of the reactive current 23 is the same or at least approximately the same as the value of the operating current. The value of the operating current is a value that is representative of a magnitude of the operating current. The value of the operating current may be characterized by a current intensity, a current flow and/or a current frequency of the operating current, for example, or may be the current intensity, the current flow or the current frequency of the operating current itself. Alternatively, the value of the operating current may be a value of a voltage that causes the operating current or that is caused by the operating current. The value of the voltage may be a maximum amplitude of a voltage profile of the voltage or a frequency of the voltage, for example. By way of example, the operating current and the reactive current 23 have the same maximum current intensity and/or the same frequency. For the value of the reactive current 23, preferably the same physical variable is used as for the value of the operating current so that the corresponding numerical values can easily be compared with one another.

The value of the reactive current 23, that is to say the numerical value of the reactive current 23, may be stored in firmly prescribed, in particular invariable, form on the memory unit of the integrated circuit 26, for example, or may be stipulated in the form of a hard-wired logic of the integrated circuit 26. In these cases, the value of the reactive current 23 can be ascertained empirically during or before the manufacture of the sensor 20, for example. Alternatively, the value of the reactive current 23 can be ascertained once, twice or repeatedly, e.g. afresh on a regular basis, using the operating current or the operating currents, and/or can be matched to the value of the operating current or the operating currents, during the operation of the sensor 20.

The processing is continued S2, with the reactive current source 18 remaining active until, during fresh execution of S4, it is identified that at least one of the operating current flows.

S8, the reactive current source 18 is deactivated, e.g. switched off or at least put into an idle mode in which it does not generate a reactive current 23. The reactive current 23 can then no longer contribute to the heating of the sensor 20, for example the microsystem 22 and e.g. the diaphragm 24. However, the identified operating current continues to heat the sensor 20 or the microphone, the microsystem 22 and e.g. the diaphragm 24 such that the temperature of the sensor 20 or of the microphone, the microsystem 22 and e.g. the diaphragm 24 does not or at least approximately does not change, that is to say neither increases nor decreases.

In optional S10, the value of the operating current can be ascertained provided that it is not firmly prescribed and/or invariable. By way of example, the operating current can be ascertained by means of the detection circuit 32.

If S10 is executed, then the value of the reactive current 23 can subsequently be matched to the value of the operating current in optional S12. By way of example, the value of the reactive current 23 may be stored on a memory unit of the integrated circuit 26. If S12 is executed, then the value of the reactive current 23 matched to the value of the operating current can replace the already stored value of the reactive current 23 on the memory unit. Subsequently, it is then possible for the matched and freshly stored value of the reactive current 23 to be used for generating the reactive current 23.

Subsequently, the execution can be continued in S2. The method can be executed continually during the operation of the sensor 20. Alternatively, the function of the sensor 20 that is inherent to the method, namely the rejection of the low-frequency noise, can be optionally switched off or on during the operation of the sensor 20, for example by means of the external apparatus 16.

Figure 7:
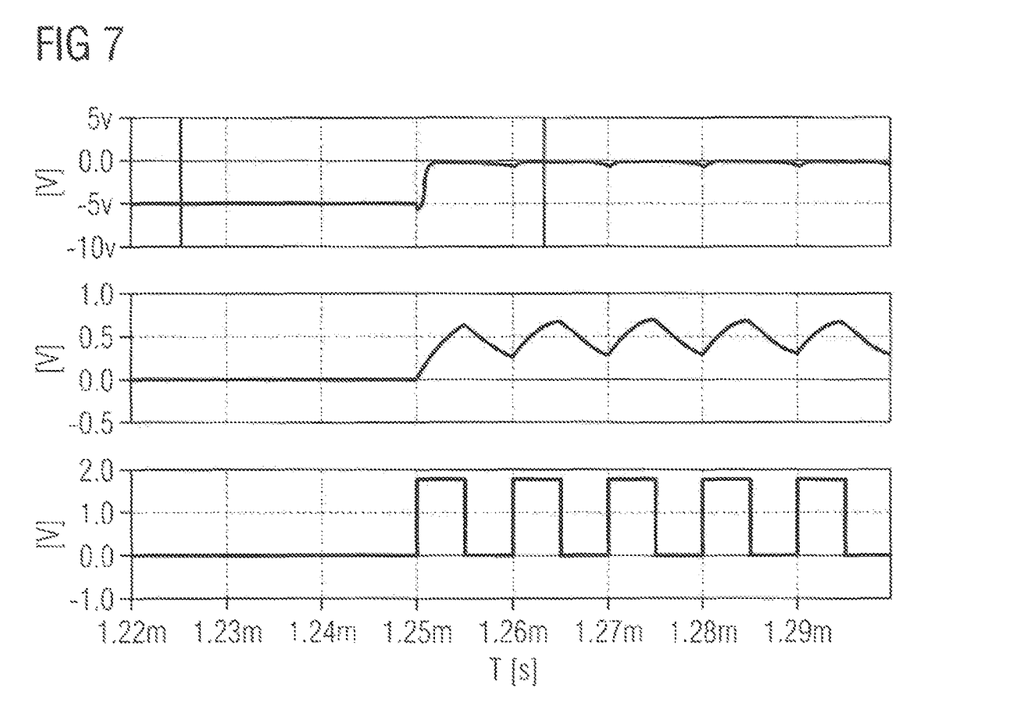
FIG. 7 shows examples of graphs to explain an operating principle of the method for operating a sensor according to FIG. 3.

FIG. 7 shows examples of graphs to explain an operating principle of the method for operating a sensor 20, for example the microphone according to FIG. 5.

The bottom graph shown in FIG. 7 shows a communication clock signal that is applied in the sensor 20 during a communication. The communication clock signal is one of the operating currents.

The middle graph shown in FIG. 7 shows a profile of a captured voltage of the communication clock signal after rectification. This voltage causes the reactive current 23 to no longer be able to flow from the electronic component 70 to the earth potential, that is to say to earth.

The top graph shown in FIG. 7 shows a profile of the reactive current 23 as a voltage curve as a function of time.

FIG. 7 reveals that up to the time 1.25 ms, no operating current flows and then an operating current flows that generates a periodic square-wave signal. The operating current is reflected in the profile of the captured voltage, the reactive current 23 being switched off in the event of a significant rise in the profile of the voltage.

Figure 8:
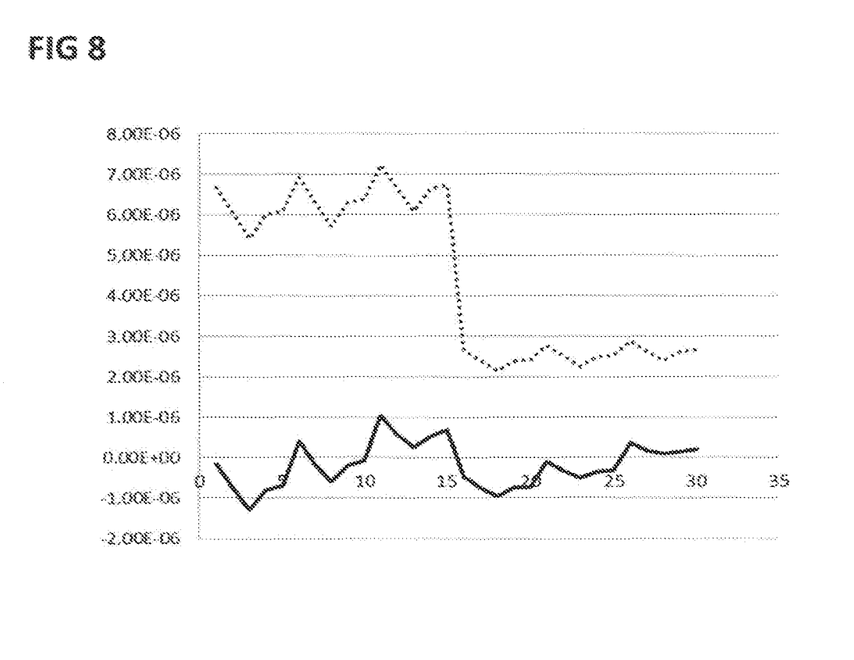
FIG. 8 shows an example of a graph to explain an effect of the method for operating a microphone according to FIG. 3.

FIG. 8 shows an example of a graph to explain an effect of the method for operating a microphone according to FIG. 5. The Y axis of the graph plots values of a change in the total current that flows in the sensor 20. The total current consists of the total operating current 21, that is to say the operating current and possibly the base current, and possibly the reactive current 23. The values on the X axis are representative of different measurements in which various parameters, such as the temperature, supply voltage, the communication speed and other technological cornerstones, for example, have been varied. In the graph, the dotted line represents the measurements without reactive current 23 and the solid line represents the measurements with reactive current 23. The graph shows and verifies the way in which the methods and apparatuses explained above work. In various embodiments, the graph shows that the current changes in the total current over time have been reduced. This reduction causes a decrease in the interference signal in the output signal of the sensor 20 and, in the case of the microphone, causes the audible interference sound to be decreased below the threshold of hearing.

Figure 9:
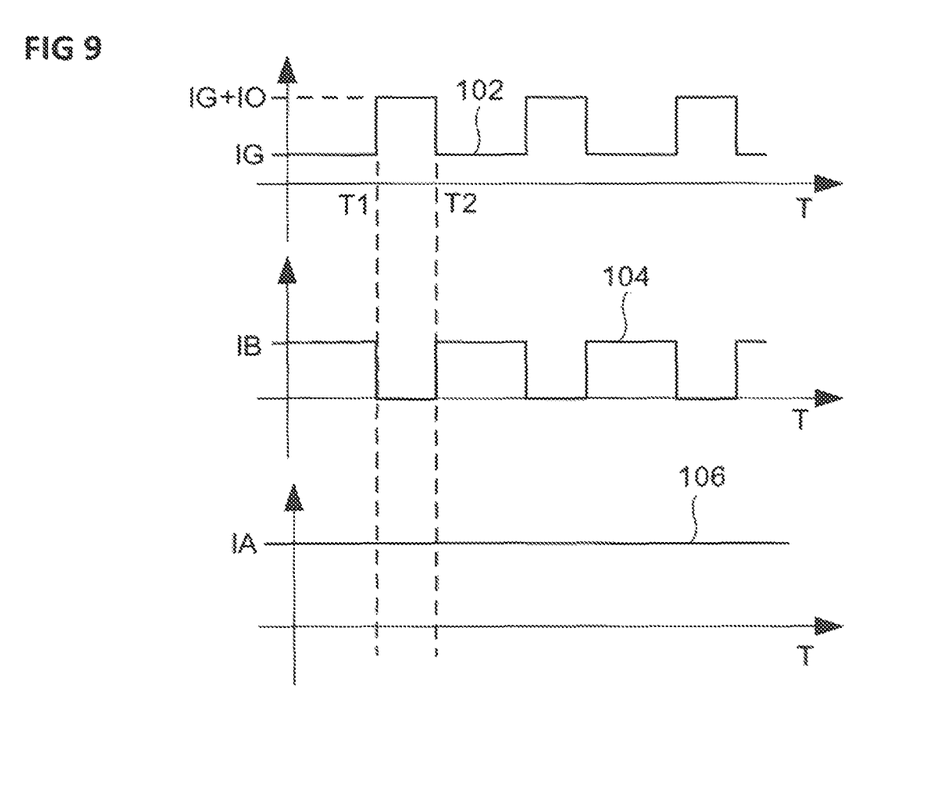
FIG. 9 shows examples of current profiles that occur when the method for operating a sensor is performed.

FIG. 9 shows examples of current profiles that occur when the method for operating a sensor is performed, the method being the method explained above, for example, and/or the sensor being one of the sensors 20 explained above. In the graphs shown in FIG. 9, the X axes each plot the time T and the Y axes each plot current values.

The top graph shows a first current profile 102 for the total operating current 21. The first current profile 102 is made up of the values IG of the base current and the values IO of the operating current. By way of example, only the base current flows before the time T1 and the base current and the operating current flow between the times T1 and T2.

The middle graph shows a second current profile 104 for the reactive current 23. The second current profile 104 is dependent on whether or not the reactive current 23 flows. In various embodiments, the reactive current 23 flows before the time T1 and does not flow between the times T1 and T2. In general, the reactive current 23 flows whenever the operating current does not flow. When it flows, the reactive current 23 has the value IB of the reactive current 23 that corresponds or at least approximately corresponds to the value IO of the operating current.

The bottom graph shows a third current profile 106 for the total current in the sensor 20. The bottom graph reveals that the total current in the sensor 20, which is made up of the total operating current, that is to say the operating current and possibly the base current, and the reactive current 23, is constant or at least approximately constant.

The embodiments are not restricted to the embodiments indicated. By way of example, the sensor 20 can have more or fewer than the electronic component parts shown. Further, the method for operating the sensor 20 can have more or fewer than the processes shown.

Various embodiments provide a method for operating a sensor that contributes to noise and/or interference in an output signal of the sensor being particularly minor.

Various embodiments provide a sensor in which a source of interference in an output signal of the microphone is particularly minor.

Various embodiments provide a method for operating a sensor. This involves an operating current being intermittently generated in the sensor. A reactive current is generated in the sensor when the operating current is not generated, and the reactive current is not generated when the operating current is generated, a value of the reactive current being the same or approximately the same as a value of the operating current.

Therefore, whenever no operating current flows, the reactive current is generated, for example by means of a reactive current source, so that the reactive current then flows. By contrast, when the operating current flows, care is taken to ensure that the reactive current no longer flows, for example by means of the reactive current source being switched off. Therefore, a current flows in the sensor, particularly either the operating current or the reactive current, at any time. Since the values of the reactive current and the operating current are the same or at least approximately the same, comparable currents flow in the sensor at any time. For the purposes of illustration, the operating current and the reactive current form a variable that is substantially constant over time and that can be taken into consideration during the operation of the sensor better than an interference variable that is not constant over time. By way of example, the two currents contribute to the heating of the sensor in equal measure. This causes a constant temperature in the sensor, regardless of whether or not the operating current flows. In the case of a microphone as a sensor, this can lead to a constant temperature in a microsystem of the microphone, particularly a diaphragm of the microphone, for example. Therefore, connecting or disconnecting the operating current no longer leads to a change of temperature in the sensor and, in the case of the microphone, no longer leads to deformation of the diaphragm. This causes noise and/or interference, which can be caused by a change of temperature, in an output signal of the sensor being particularly minor or even being eliminated completely. This contributes to the sensor having a particularly high level of measurement accuracy. In the case of the microphone, such interference can occur as an interfering sound, e.g. as low-frequency noise. The elimination of this interference using the reactive current contributes to the microphone having a particularly good pickup quality. In addition to the operating current and the reactive current, it is optionally also possible for a base current that is constant over time to flow in the sensor, which base current does not need to be compensated for on account of its constancy over time, however, and can be ignored in this context.

By way of example, the reactive current is therefore used to heat the sensor, for example the microphone, e.g. the microsystem, e.g. the diaphragm. The reactive current is therefore not used for exchanging information within the sensor and/or not used for operating one or more components of the sensor. Although the reactive current causes an increased current and energy requirement for the sensor, on the one hand, it contributes to the particularly good measurement quality of the sensor, on the other hand.

The value of the operating current may be representative of a current intensity, a current frequency and/or a current flow of the operating current, for example. By way of example, the value of the operating current may be the current intensity, the current frequency or the current flow of the operating current itself. Alternatively, the value of the operating current may be a value of an operating voltage that causes the operating current or that is caused by the operating current. The value of the operating voltage may be a maximum amplitude of the operating voltage or a frequency of the operating voltage, for example.

According to one development, a check is performed to determine whether or not the operating current is generated. This check can be effected by means of an integrated circuit of the sensor or by means of an apparatus that is external to the sensor, for example.

According to one development, the operating current is used to transmit information. In other words, the operating current may be a communication current or an information current. By way of example, the information is transmitted in the form of a modulation of a DC or AC current. The communication current may be or have a communication clock signal, for example.

According to one development, the operating current flows via an interface of the sensor, wherein the interface is configured for communication with an external apparatus. By way of example, the sensor of the external apparatus makes the information that is encoded in the operating current available. Alternatively or additionally, the operating current can be used to transmit information from the external apparatus via the interface to the integrated circuit.

According to one development, the sensor has an electronic unit and the operating current is used to transmit information of the electronic unit. By way of example, the electronic unit provides the integrated circuit with the information and/or the electrical unit receives the information from the integrated circuit.

According to one development, the operating current is used to transmit information from the electronic unit to the external apparatus. Alternatively or additionally, the operating current can be used to transmit the information from the external apparatus via the interface and the integrated circuit to the electronic unit.

According to one development, the information is exchanged between the electronic unit and the external apparatus via the integrated circuit. In other words, the integrated circuit is used to forward the information received from the electronic unit to the external apparatus or to forward the information received from the external apparatus to the electronic unit.

According to one development, the electronic unit is a temperature sensor for sensing a temperature in the sensor, wherein the information is representative of the temperature. Therefore, the operating current may be modulated such that it is representative of the temperature of the sensor. In the case of the microphone as a sensor, the temperature of the sensor may be e.g. the temperature of the microsystem, e.g. the temperature of the diaphragm.

According to one development, the value of the reactive current is firmly prescribed. By way of example, during the development of the sensor, it is possible to empirically ascertain what operating current normally occurs during operation of the sensor and what value the applicable operating current has. This value can be transferred to the value of the reactive current, which can be stored in a memory element of the sensor or can be provided in the form of a hard-wired logic unit in the sensor. During normal operation of the sensor, the integrated circuit can then provide the reactive current by means of the reactive current source so as to have the applicable value of the reactive current.

According to one development, the value of the operating current is captured and the value of the reactive current is matched to the captured value of the operating current. By way of example, the detection circuit is able not only to sense whether or not the operating current flows but also to capture the value of the operating current. The integrated circuit can then actuate the reactive current source such that the reactive current is provided so as to have the applicable value.

According to one development, the sensor is configured as a microphone. The microphone has a microsystem having a diaphragm for capturing sound waves and the integrated circuit that is electrically connected to the microsystem and that is configured to receive a signal that is representative of a movement of the diaphragm from the microsystem. Alternatively, the sensor is configured as a pressure sensor or gas sensor.

Various embodiments provide the sensor having: an integrated circuit that is configured to generate an operating current in the sensor, and a reactive current source that is electrically connected to the integrated circuit and that is configured to generate a reactive current when the operating current is not generated, wherein a value of the reactive current is the same or approximately the same as the value of the operating current.

The effects and developments of the method for operating the sensor that are cited above can be readily transferred to the sensor.

According to one development, the sensor has a detection circuit that is connected to the integrated circuit and that is configured to identify whether or not the operating current flows.

According to one development, the detection circuit is configured to capture the value of the operating current, and the integrated circuit is configured to actuate the reactive current source such that it matches the value of the reactive current to the captured value of the operating current.

According to one development, the sensor has the interface that is configured for communication with the external apparatus.

According to one development, the integrated circuit generates the operating current in reaction to a first communication signal of the external apparatus and the reactive current source generates the reactive current in reaction to a second communication signal of the external apparatus.

According to one development, the sensor has the electronic unit, wherein the operating current is used to transmit information of the electronic unit.

According to one development, the electronic unit is the temperature sensor for sensing the temperature in the sensor and the information is representative of the temperature.

According to one development, the sensor has the memory unit that stores the value of the reactive current as a fixed value.

According to one development, the sensor is configured as a microphone and has a microsystem having a diaphragm for capturing sound waves, wherein the integrated circuit is electrically connected to the microsystem and is configured to receive an electrical signal that is representative of a movement of the diaphragm from the microsystem. Alternatively, the sensor is configured as a pressure sensor or gas sensor.

LIST OF REFERENCE SIGNS external apparatus 16
first communication signal 17
reactive current source 18
second communication signal 19
sensor 20
total operating current 21
microsystem 22
reactive current 23
diaphragm 24
third communication signal 25
integrated circuit 26
interface 28
temperature sensor 30
detection circuit 32
supply voltage 50
first transistor 52
second transistor 54
third transistor 56
first earth potential 58
reference component 60
fourth transistor 62
fifth transistor 64
sixth transistor 66
electronic component 70
seventh transistor 72
eighth transistor 74
ninth transistor 76 tenth transistor 80
eleventh transistor 82
clock signal 90
diode 92
resistor 94
second earth potential 96
capacitor 98
first current profile 102
second current profile 104
third current profile 106
value of base current IG
value of operating current IO
value of reactive current D3
average current value IA
time T While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating a sensor, the method comprising:
   intermittently generating an operating current in the sensor;
   generating a reactive current in the sensor when the operating current is not generated; and
   not generating the reactive current when the operating current is generated;
   wherein a value of the reactive current is the same or approximately the same as a value of the operating current.

2. The method of claim 1,
   wherein the generating of the reactive current is preceded by a check being performed to determine whether or not the operating current is generated.

3. The method of claim 1,
   wherein the operating current is used to transmit information.

4. The method of claim 3,
   wherein the sensor comprises an electronic unit; and
   wherein the operating current is used to transmit information of the electronic unit.

5. The method of claim 4,
   wherein the operating current is used to transmit information from the electronic unit to the external apparatus.

6. The method of claim 5,
   wherein the information is exchanged between the electronic unit and the external apparatus via an integrated circuit.

7. The method of claim 4,
   wherein the electronic unit is a temperature sensor for sensing a temperature in the sensor; and
   wherein the information is representative of the temperature.

8. The method of claim 1,
   wherein the operating current flows via an interface of the sensor; and
   wherein the interface is configured for communication with an apparatus external to the sensor.

9. The method of claim 1,
   wherein the value of the reactive current is firmly prescribed.

10. The method of claim 1,
    wherein the value of the operating current is captured; and
    wherein the value of the reactive current is matched to the captured value of the operating current.

11. The method of claim 1,
    wherein the sensor is configured as a microphone that has a microsystem having a diaphragm for capturing sound waves and an integrated circuit that is electrically connected to the microsystem and that is configured to receive a signal that is representative of a movement of the diaphragm from the microsystem.

12. A sensor, comprising:
    an integrated circuit configured to generate an operating current in the sensor; and
    a reactive current source that is electrically connected to the integrated circuit and that is configured to generate a reactive current when the operating current is not generated;
    wherein a value of the reactive current is the same or approximately the same as a value of the operating current.

13. The sensor of claim 12, further comprising:
    a detection circuit that is connected to the integrated circuit and that is configured to identify whether or not the operating current flows.

14. The sensor of claim 13,
    wherein the detection circuit is configured to capture the value of the operating current; and
    wherein the integrated circuit is configured to actuate the reactive current source such that it matches the value of the reactive current to the captured value of the operating current.

15. The sensor of claim 12, further comprising:
    an interface configured for communication with an external apparatus.

16. The sensor of claim 15,
    wherein the integrated circuit is configured to generate the operating current in reaction to a first communication signal of the external apparatus and the reactive current source is configured to generate the reactive current in reaction to a second communication signal of the external apparatus.

17. The sensor of claim 12, further comprising:
    an electronic unit;
    wherein the operating current is used to transmit information of the electronic unit.

18. The sensor of claim 17,
    wherein the electronic unit is a temperature sensor for sensing a temperature in the sensor; and
    wherein the information is representative of the temperature.

19. The sensor of claim 12, further comprising:
    a memory unit that stores the value of the reactive current as a fixed value.

20. The sensor of claim 12,
    which is configured as a microphone and which has a microsystem having a diaphragm for capturing sound waves;
    wherein the integrated circuit is electrically connected to the microsystem and is configured to receive an electrical signal that is representative of a movement of the diaphragm from the microsystem.

* * * * *